US008277707B2

(12) United States Patent
Waldron

(10) Patent No.: US 8,277,707 B2
(45) Date of Patent: Oct. 2, 2012

(54) ROTARY TABLET PRESS

(75) Inventor: Michel Simon Waldron, Southampton (GB)

(73) Assignee: Courtoy NV, Halle (BE)

(*) Notice: Subject to any disclaimer, the term of this patent is extended or adjusted under 35 U.S.C. 154(b) by 0 days.

(21) Appl. No.: 12/818,221

(22) Filed: Jun. 18, 2010

(65) Prior Publication Data

US 2011/0012283 A1 Jan. 20, 2011

Related U.S. Application Data

(62) Division of application No. 11/461,874, filed on Aug. 2, 2006, now abandoned.

(51) Int. Cl.

*B28B 17/04* (2006.01)
*B29B 11/12* (2006.01)
*B30B 11/08* (2006.01)

(52) U.S. Cl. .......... 264/109; 264/39; 264/101; 264/263; 264/278; 425/225; 425/345; 425/355

(58) Field of Classification Search .................. 264/101, 264/109, 39, 85, 239, 263, 278; 425/345, 425/348 R, 350, 353, 355, 149, 185, 188, 425/225

See application file for complete search history.

(56) References Cited

U.S. PATENT DOCUMENTS 3,825,387 A 7/1974 Gilman
4,210,310 A 7/1980 Kay
4,222,407 A 9/1980 Ruschke et al.
4,257,380 A 3/1981 Bendig et al.
4,259,049 A 3/1981 Willich
4,362,491 A 12/1982 Livingstone
4,403,935 A * 9/1983 Crossley et al. .............. 425/210
4,456,446 A 6/1984 Konig
4,560,095 A 12/1985 Shew
4,569,650 A 2/1986 Kramer
4,857,250 A 8/1989 Gale et al.
5,004,413 A 4/1991 Stopforth
5,151,280 A 9/1992 Arndt et al.
5,392,769 A 2/1995 Siegel
5,843,488 A 12/1998 Korsch et al.
5,965,077 A 10/1999 Rowley et al.
6,050,444 A 4/2000 Sugg
6,676,863 B2 * 1/2004 Christiaens et al. ............ 264/39

(Continued)

FOREIGN PATENT DOCUMENTS

BS 6361305 B1 3/2002

(Continued)

*Primary Examiner* — Joseph Del Sole
*Assistant Examiner* — Seyed Masoud Malekzadeh
(74) *Attorney, Agent, or Firm* — Sughrue Mion, PLLC

(57) ABSTRACT

A rotary tablet press comprises a housing and a rotary die table having dies arranged circumferentially. Each die is associated with a punch having an end receivable in the die and being arranged for compression of a powder or granular material in the die by reciprocation of the punch by rotation of the die table. The rotary tablet press comprises a feeding device and a tablet discharge device. Each die opening and its corresponding punch end are enclosed in a compression chamber comprising a dust extraction nozzle. The compression chamber communicates with the surroundings of the tablet press through a non-return valve arranged to prevent outflow from the compression chamber to the surroundings of the tablet press.

10 Claims, 9 Drawing Sheets

U.S. PATENT DOCUMENTS

| | | | | |
|---|---|---|---|---|
| 6,884,054 | B2 * | 4/2005 | Shimada | 425/107 |
| 6,972,105 | B2 | 12/2005 | Boeckx et al. | |
| 7,004,162 | B1 | 2/2006 | Foley | |
| 2003/0042639 | A1 | 3/2003 | Christiaens et al. | |
| 2004/0000336 | A1 | 1/2004 | Goglio | |
| 2004/0191347 | A1 | 9/2004 | Boeckx et al. | |
| 2004/0207107 | A1 | 10/2004 | Christiaens et al. | |
| 2005/0103798 | A1 | 5/2005 | Luigi | |
| 2005/0151292 | A1 * | 7/2005 | Shimada et al. | 264/101 |
| 2005/0200038 | A1 | 9/2005 | Vogeleer et al. | |
| 2005/0249621 | A1 | 11/2005 | Bethel | |
| 2006/0013914 | A1 * | 1/2006 | Shimada et al. | 425/408 |
| 2007/0149108 | A1 * | 6/2007 | Behns et al. | 454/238 |

FOREIGN PATENT DOCUMENTS

| | | | |
|---|---|---|---|
| EP | 0 373 833 | A2 | 6/1990 |
| EP | 0 406 936 | A1 | 1/1991 |
| WO | 2005/093303 | A1 | 10/2005 |

* cited by examiner

ROTARY TABLET PRESS

This is a divisional of application Ser. No. 11/461,874 filed Aug. 2, 2006, now abandoned. The entire disclosure of the prior application, application Ser. No. 11/461,874 is considered part of the disclosure of the accompanying divisional application and is hereby incorporated by reference.

BACKGROUND OF THE INVENTION

The present invention relates to a rotary tablet press comprising a housing, a rotary die table having a number of dies arranged circumferentially, each die being associated with at least a first punch having a first end receivable in the die through an opening of the die and arranged for compression of a powder or granular material in the die by reciprocation of the punch, at least a cam for cooperation with a second end of the punches in order to effect axial displacement of the punches by rotation of the die table, a feeding device for the supply of material to be compressed into the dies, and a tablet discharge device for removal of compressed material in the form of tablets, wherein each die opening and its corresponding first punch end are enclosed in a compression chamber, said compression chamber comprising at least one dust extraction nozzle communicating with a dust extraction tube located outside the compression chamber.

US 2004/0207107 A1 (assigned to Courtoy N V) describes a rotary tablet press having dust extraction nozzles placed in appropriate positions in the compression chamber to prevent build-up of dust in the compression chamber. The suction system may advantageously be designed to constantly keep a certain under pressure in the compression chamber in order to prevent any leakage from the chamber.

Furthermore, it is well-known practice to provide the compression chamber of a rotary tablet press with a chimney-like, vertical air intake duct extending from an upper wall of the compression chamber to an intake opening at an area at the top of the rotary tablet press. Through this duct, air from the surroundings of the rotary tablet press may enter the compression chamber in order to replace air removed by means of dust extraction nozzles. The intake opening of the duct may be covered by means of a simple filter or a HEPA filter, if necessary. Such a filter may both ensure that the air entering the compression chamber is clean and that no powder or dust leaks from the compression chamber. However, such filters have the disadvantage that they become clogged during use, and therefore they must be monitored and replaced when necessary.

In another known application, the compression chamber is comprised by a compression unit detachably mounted in the housing of the rotary tablet press, and the compression unit is located in a compression section delimited by an upper partition wall and a lower partition wall of the housing of the rotary tablet press. A vertical air intake duct similar to the above explained projects from the upper side of the upper partition wall in order to enable air to enter the compression section from the surroundings of the tablet press. Thereby, air may by suction enter the compression chamber from the compression section through a hole in the wall of the compression chamber, or the compression chamber may be connected with the vertical air intake duct by means of a rigid or flexible pipe or tube connection extending through the compression section.

SUMMARY OF THE INVENTION

An object of the present invention is to provide a rotary tablet press, whereby air intake to the compression chamber is enabled without the risk of dust leakage to the surroundings and without the above-mentioned disadvantages.

In view of this object, said compression chamber communicates with the surroundings of the tablet press through a non-return valve arranged to prevent outflow from the compression chamber to the surroundings of the tablet press. A non-return valve may allow air to enter the compression chamber and prevent dust from leaving the compression chamber; the valve may be of simple construction and does not need replacement on a regular basis.

The valve may comprise a valve flap and a valve seat facing the inside of the compression chamber, and the valve flap may be biased against the valve seat.

The valve seat may be concave and the valve flap may be made of flexible material. Thereby, the effective contact area between the valve flap and the valve seat in which the contacting surfaces have to be brought out of contact in order to open the valve is reduced, thereby reducing the under pressure necessary to open the valve. This is because in this embodiment, only the peripheral part of the valve flap has to be lifted from the valve seat in order to open the valve.

In an embodiment, the valve flap is fixed on a shaft that is mounted axially displaceable in a central hole in the valve seat, and the shaft is spring loaded to press the valve flap against the valve seat. If a relatively weak spring is used, only very little under pressure is needed to open the valve, even if the valve flap is made of a more rigid material.

In an embodiment, the valve seat is circular and is provided with a plurality of through holes along its periphery. The circular parts are easy to manufacture with tight tolerances, which allow for a good closing of the valve flap against the valve seat and hence a good sealing action.

In an embodiment, the compression chamber is delimited by a top wall in which the non-return valve is located, and the non-return valve communicates with the surroundings of the tablet press through a vertical air intake duct. Thereby, very little under pressure is needed to open the valve.

In an embodiment, the compression chamber is comprised by a compression unit detachably mounted in the housing of the rotary tablet press, and the non-return valve is located in wall of the compression unit.

In an embodiment, the compression unit is located in a compression section delimited by a upper partition wall and a lower partition wall of the housing of the rotary tablet press, and a vertical air intake duct projects from the upper side of the upper partition wall in order to enable air to enter the compression section from the surroundings of the tablet press. Thereby, very little under pressure is needed to open the valve.

In an embodiment, the non-return valve is detachably connected with the vertical air intake duct by means of a vertically arranged connection piece. The connection piece allows for a detachment of the intake duct from the valve. Therefore, the compression unit will stay detachably connected in the housing.

In an embodiment, the non-return valve is detachably connected with the vertical air intake duct by means of a flexible tube. Thereby, the air intake duct need not necessarily be in line with the valve, which is sometimes, due to other dimensional constraints, not possible. The flexible tube allows more freedom to place the air intake duct or the valve.

In another embodiment, said compression chamber communicates with the surroundings of the tablet press through a pressure controlled valve adapted to open, when the pressure inside the compression chamber is smaller than the pressure at the surroundings of the tablet press, and adapted to close, when the pressure inside the compression chamber is larger than the pressure at the surroundings of the tablet press. In this way, the valve will prevent outflow of air from the compression chamber to the surroundings, and thereby it will be prevented that dust leaks from the compression chamber.

In an embodiment, the pressure-controlled valve comprises a valve element that is biased against a valve seat.

In an embodiment, the pressure-controlled valve is controlled by a computer on the basis of a signal provided by a pressure transducer. An actuated valve allows for a stronger valve, made of stronger, more rigid material that can be pressed with higher forces against the valve seat. Hence, it is possible to obtain a better sealing action.

In an embodiment, the compression chamber is delimited by a top wall in which the non-return valve is located, and the non-return valve communicates with the surroundings of the tablet press through a vertical air intake duct.

In an embodiment, the compression chamber is comprised by a compression unit detachably mounted in the housing of the rotary tablet press, and the non-return valve is located in wall of the compression unit.

In an embodiment, the compression unit is located in a compression section delimited by a upper partition wall and a lower partition wall of the housing of the rotary tablet press, and a vertical air intake duct projects from the upper side of the upper partition wall in order to enable air to enter the compression section from the surroundings of the tablet press.

In an embodiment, the non-return valve is detachably connected with the vertical air intake duct by means of a vertically arranged connection piece.

In an embodiment, the non-return valve is detachably connected with the vertical air intake duct by means of a flexible tube.

In yet another embodiment, said compression chamber communicating with the surroundings of the tablet press through a valve comprising a valve flap made of a material that is impervious to dust and a valve seat facing the inside of the compression chamber, and the valve flap being biased against the valve seat.

In an embodiment, the valve flap is made of a filter material. This will allow an air intake at very low under pressure, smaller than that needed to lift the valve flap from the valve seat.

In an embodiment, the compression chamber is delimited by a top wall in which the non-return valve is located, and the non-return valve communicates with the surroundings of the tablet press through a vertical air intake duct.

In an embodiment, the compression chamber is comprised by a compression unit detachably mounted in the housing of the rotary tablet press, and the non-return valve is located in wall of the compression unit.

In an embodiment, the compression unit is located in a compression section delimited by a upper partition wall and a lower partition wall of the housing of the rotary tablet press, and a vertical air intake duct projects from the upper side of the upper partition wall in order to enable air to enter the compression section from the surroundings of the tablet press.

In an embodiment, the non-return valve is detachably connected with the vertical air intake duct by means of a flexible tube.

BRIEF DESCRIPTION OF THE DRAWINGS

The invention will now be explained in more detail below by means of examples of embodiments with reference to the schematic drawing, in which.

DETAILED DESCRIPTION OF THE INVENTION

Figure 1:
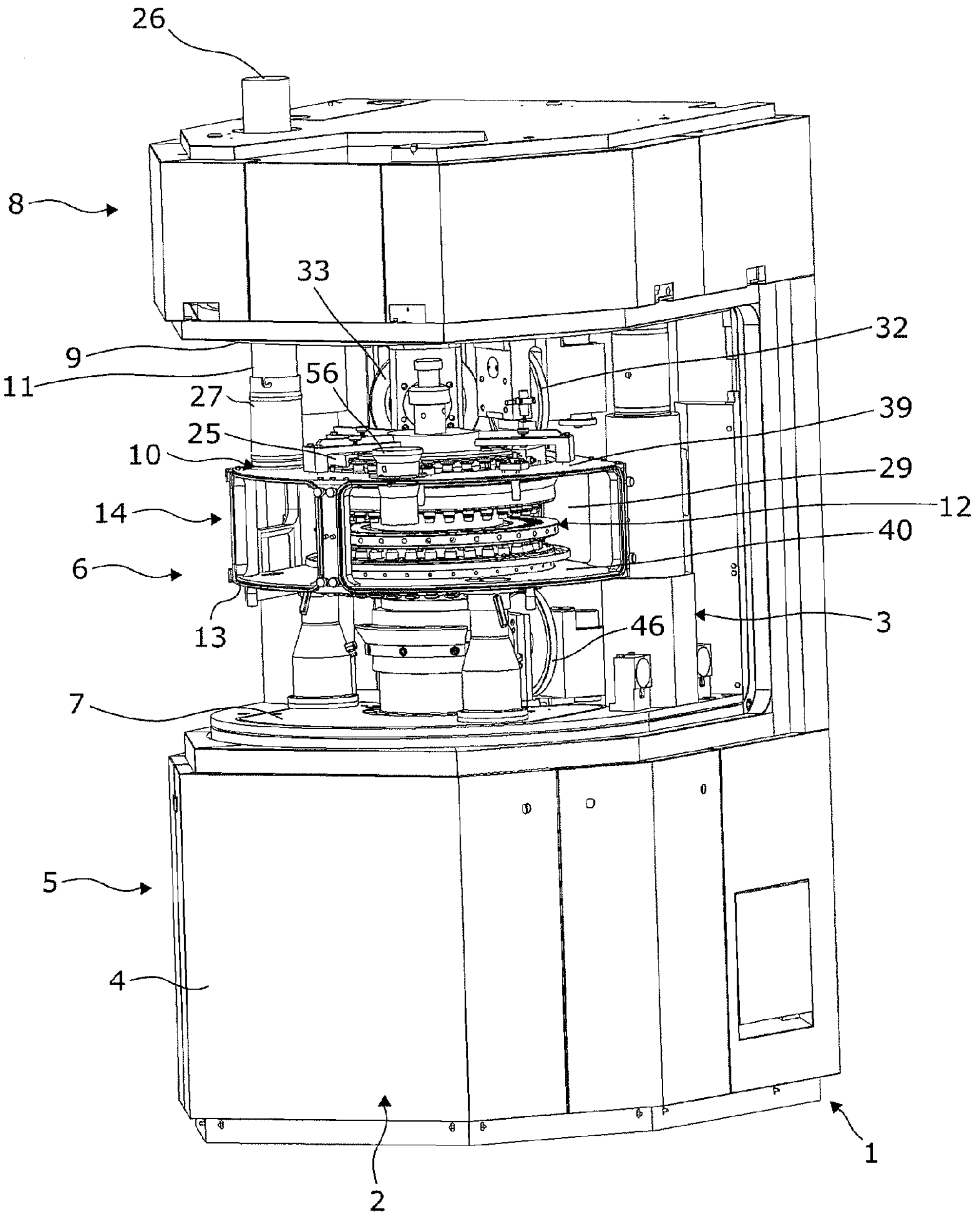
FIG. 1 is a perspective view of a rotary tablet press according to the invention, the cover of the housing being partly removed.

FIG. 1 shows a rotary tablet press 1 for compression of a feedstock in the form of powder or granular material into tablets, compacts or the like. The press shown is of a type suitable for use in the pharmaceutical industry, but the press according to the invention may as well be a so-called industrial press employed in the production of a variety of different products, such as vitamins, pet food, detergents, explosives, ceramics, batteries, balls, bearings, nuclear fuels, etc.

The rotary tablet press 1 has a press housing 2 comprising an internal frame 3, which supports various components located in the housing 2, and an outer lining 4, which is shown only at a lower section 5 of the press. The press housing 2 is composed of three sections, which are located on top of each other and are separated by means of partition walls. The lower section, designated the drive section 5, is separated from a central section, designated the compression section 6, by a lower partition wall 7, and the compression section 6 is separated from an upper section, designated the accessory section 8, by an upper partition wall 9.

Figure 3:
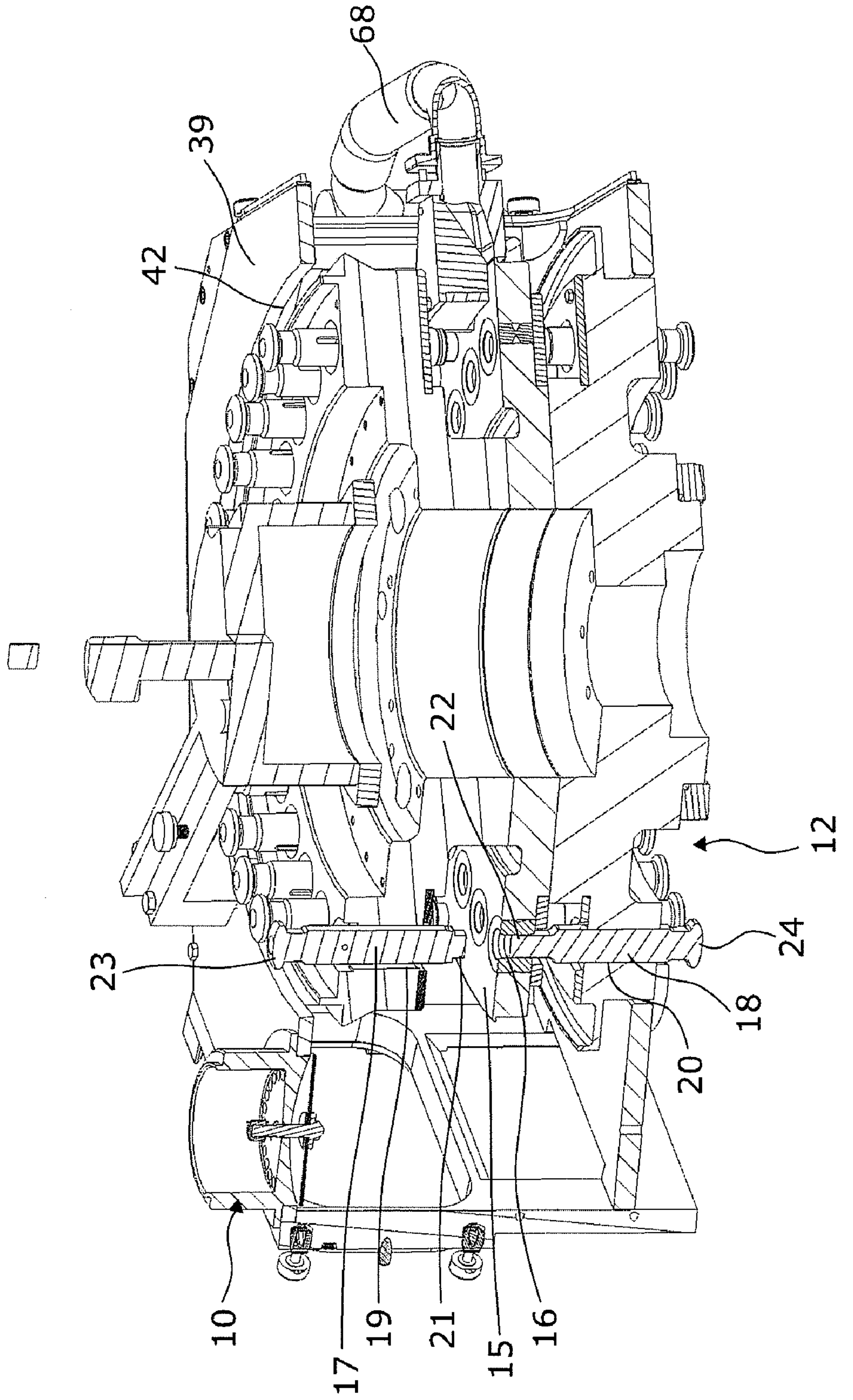
FIG. 3 is a perspective view showing a section through the compression unit of the rotary tablet press shown in FIG. 1.
Figure 4:
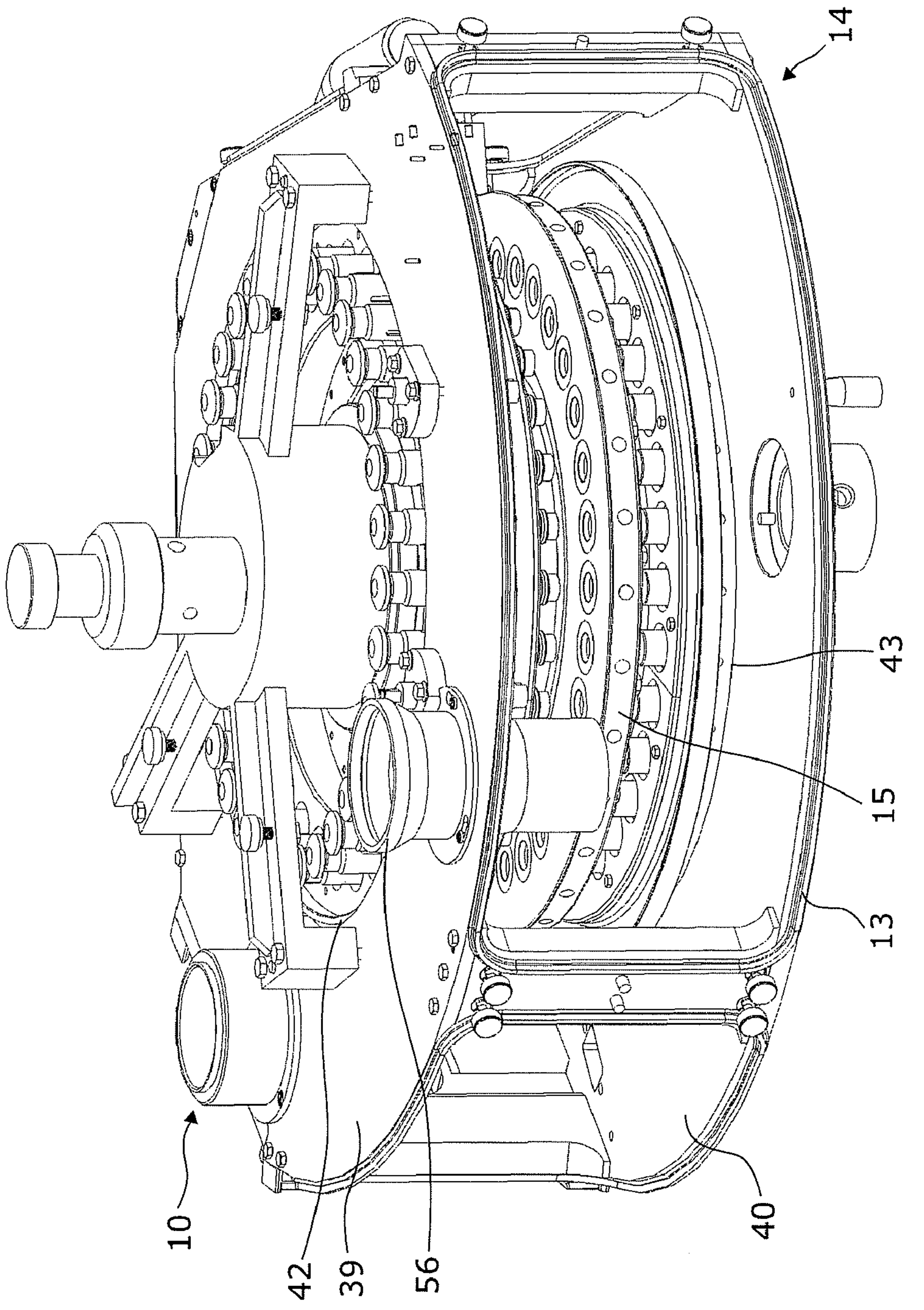
FIG. 4 is a perspective view of the compression unit shown in FIG. 3.
Figure 5:
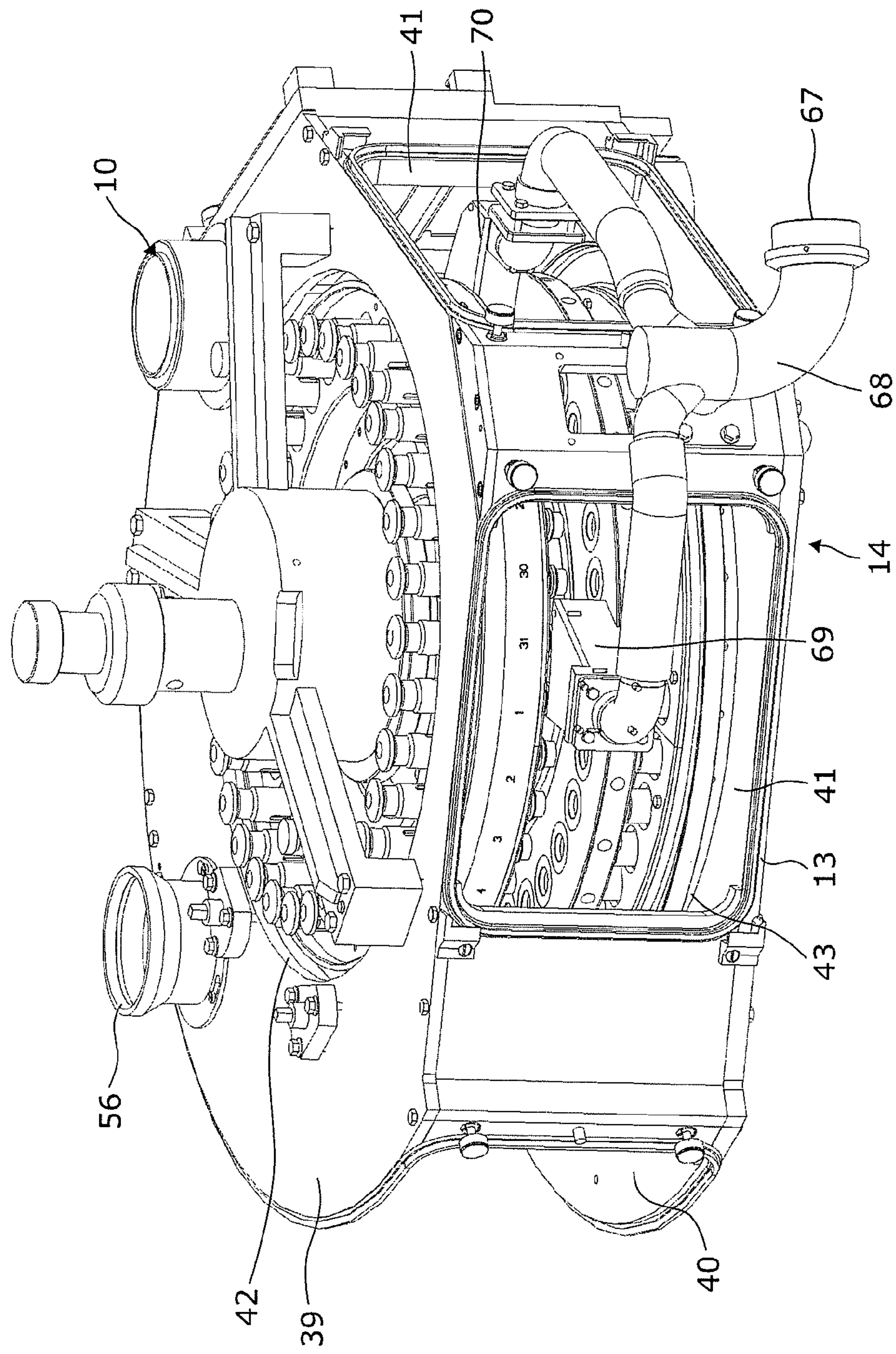
FIG. 5 is a perspective view of the compression unit shown in FIG. 4, seen from behind.

The drive section 5 comprises a not shown electrical drive motor driving a not-shown vertical drive shaft projecting up through a central opening in the lower partition wall 7 and having at its upper end a coupling part for detachable connection with a rotary turret 12 located in a casing 13 of a compression unit 14 which is arranged detachably in the compression section 6 of the press housing 2, see also FIGS. 3 to 5. The chamber comprised by the compression unit 14 is designated the compression chamber 29.

Referring to FIGS. 3 to 5, the rotary turret 12 comprises a die table 15 having a number of dies arranged evenly distributed along its circumference, each die 16 having the form of a bore arranged with its axis parallel to the vertical rotational axis of the turret 12. On either side of the die table 15 are arranged top and bottom punches 17, 18, respectively, in corresponding guides 19, 20 accommodated in the turret 12 so that a first end 21, 22 of each punch 17, 18 is able to enter a corresponding die 16 by displacement of the punch in its guide 19, 20 in order to compress material in the die. The punches 17, 18 may be sealed against their guides 19, 20 at the end of these facing the die table 15 by means of not shown lip seals. For use with toxic products, a bellows seal, for instance of silicone, may be employed.

A second end 23, 24 of each punch 17, 18 is in a well-known manner co-operating with top and bottom cams, respectively, arranged stationary in relation to the press housing 2 in order to effect axial displacement of the punches by rotation of the turret 12. Only the top cams 25 are visible, see FIGS. 1 and 2. The cams only extend along part of the circumference of the turret, and at that circumferential position where the final compression of the material in the die is to be performed, top and bottom precompression rollers 32, 46 and top and bottom main compression rollers (of which only the top roller 33 is shown), respectively, take over the displacement of the punches 17, 18.

The casing 13 of the compression unit 14 comprises a top wall 39, a bottom wall 40 and more transparent side walls 41. A number of the side walls 41 may be detached from the compression unit 14 in order to gain access to the internal components of the unit for exchange of components at change-over between batches of different products, for cleaning or for maintenance, see also FIG. 5, in which the side wall at the left side of the compression unit has been removed. The top and bottom walls 39, 40 are substantially plane, each having a central circular opening 42, 43 sealed rotatably against the periphery of the turret 12 by means of a not shown seal, such as a lip seal.

The compression unit 14 is provided with a feeding device in the form of a not shown, well-known double rotary feeder with two rotary paddles located in a feeder housing and driven by means of separate drive motors located in the accessory section 8 of the press housing 2 and providing for independent speed setting of the paddles. The feeding device has been removed in the figures for the sake of simplicity.

The feeder housing has a feedstock inlet that opens through the top wall 39 of the casing 13 of the compression unit 14 and is provided with a first coupling half 56 for connection with a corresponding, not shown, second coupling half provided on a lower end of a similarly not shown supply channel in the press housing 2. Said first and second coupling halves may be provided with closing mechanisms, and for operation with toxic products they may constitute a so-called split valve, such as a split butterfly valve.

The compression unit 14 is further provided with a not shown tablet chute protruding from the casing 13 for conducting away compressed material in the form of tablets from the dies 16.

Further, the compression unit 14 is provided with a dust extraction coupling half 67, see FIG. 5, for connection with a corresponding, not shown, coupling half that is located in the press housing 2 and connected to a not shown, well-known, suction system. The dust extraction coupling half 67 is by means of tubing 68 connected with dust extraction nozzles 69, 70 placed in appropriate positions inside the casing 13 of the compression unit 14 in order to prevent build-up of dust in the casing. The suction system may advantageously be designed to constantly keep a certain under pressure in the casing 13 of the compression unit 14 to prevent any leakage from the casing. The under pressure may advantageously be monitored and controlled to maintain a certain value. The dust extraction coupling half 67 on the unit 14 may together with the corresponding coupling half in the press housing 2 constitute a split valve of the above-described type.

Figure 8:
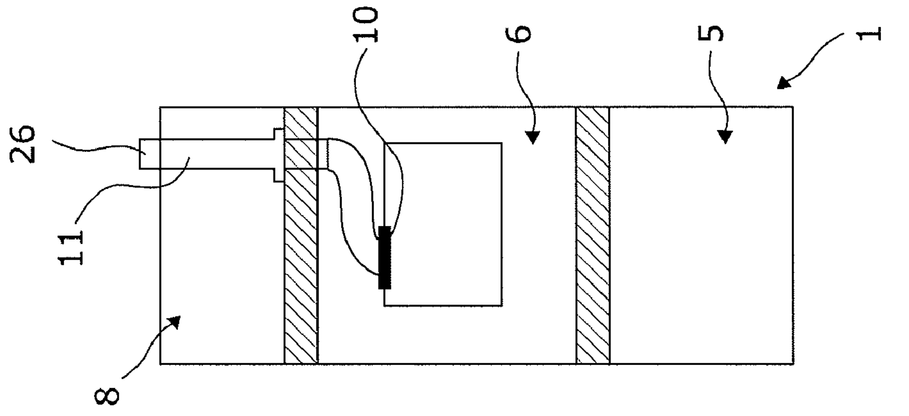
FIGS. 6 to 8 show very schematic three different embodiments of a rotary tablet press of the type shown in FIG. 1.
Figure 7:
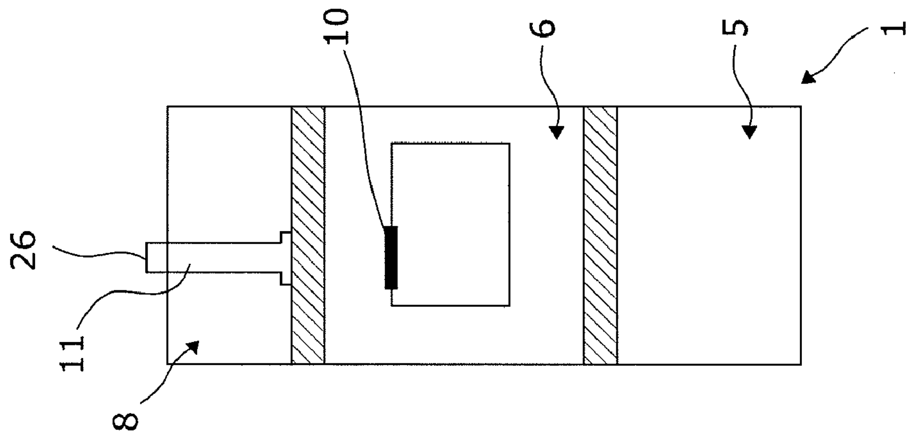
Figure 6:
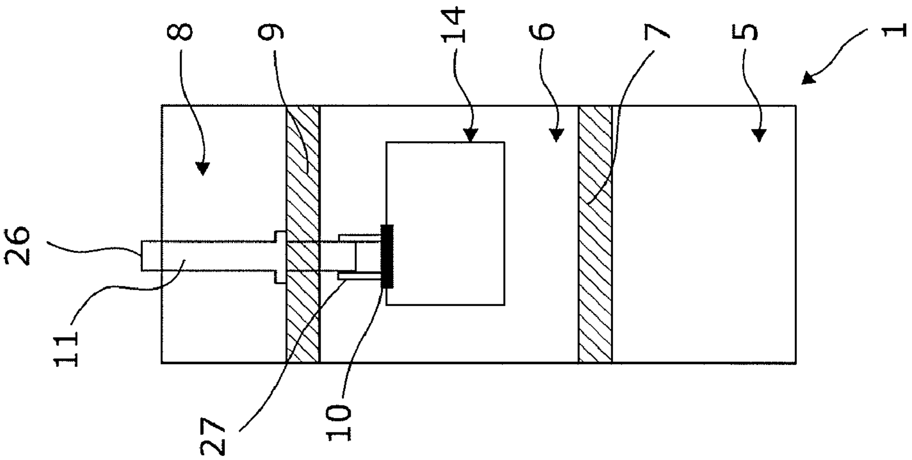

In order to both allow air to enter the compression chamber and prevent dust from leaving the compression chamber, a non-return valve 10 is arranged in the top wall 39 of the casing 13 of the compression unit 14. Air may reach the non-return valve 10 from the surroundings of the rotary tablet press through a vertical air intake duct 11 extending from the upper partition wall 9 of the housing 2 to an intake opening 26 at an area at the top of the rotary tablet press. The non-return valve 10 may be connected with the vertical air intake duct 11 by means of a connection piece 27 that is slidably connected with the vertical air intake duct 11, see FIGS. 1 and 6. FIG. 8 shows another embodiment, whereby the non-return valve 10 is connected with the vertical air intake duct 11 by means of a flexible tube 28. In this embodiment, as is seen in the figure, the vertical air intake duct 11 is not aligned with the non-return valve 10. FIG. 7 shows yet another embodiment, whereby the non-return valve 10 is not connected directly with the vertical air intake duct 11, but may receive air through the vertical air intake duct 11 from the surroundings via the compression section 6.

Figure 9:
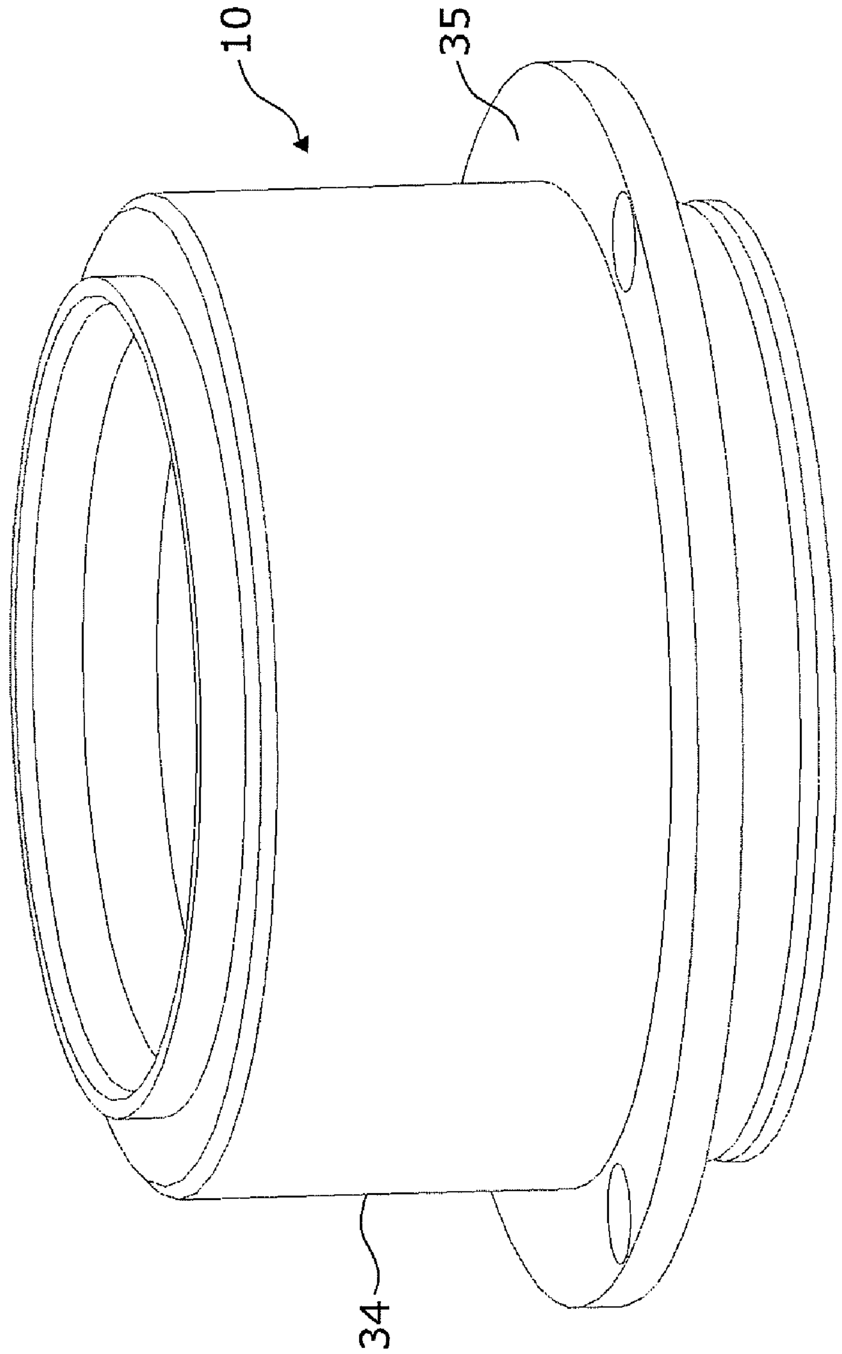
FIG. 9 is a perspective view of a valve of the rotary tablet press according to the invention.
Figure 10:
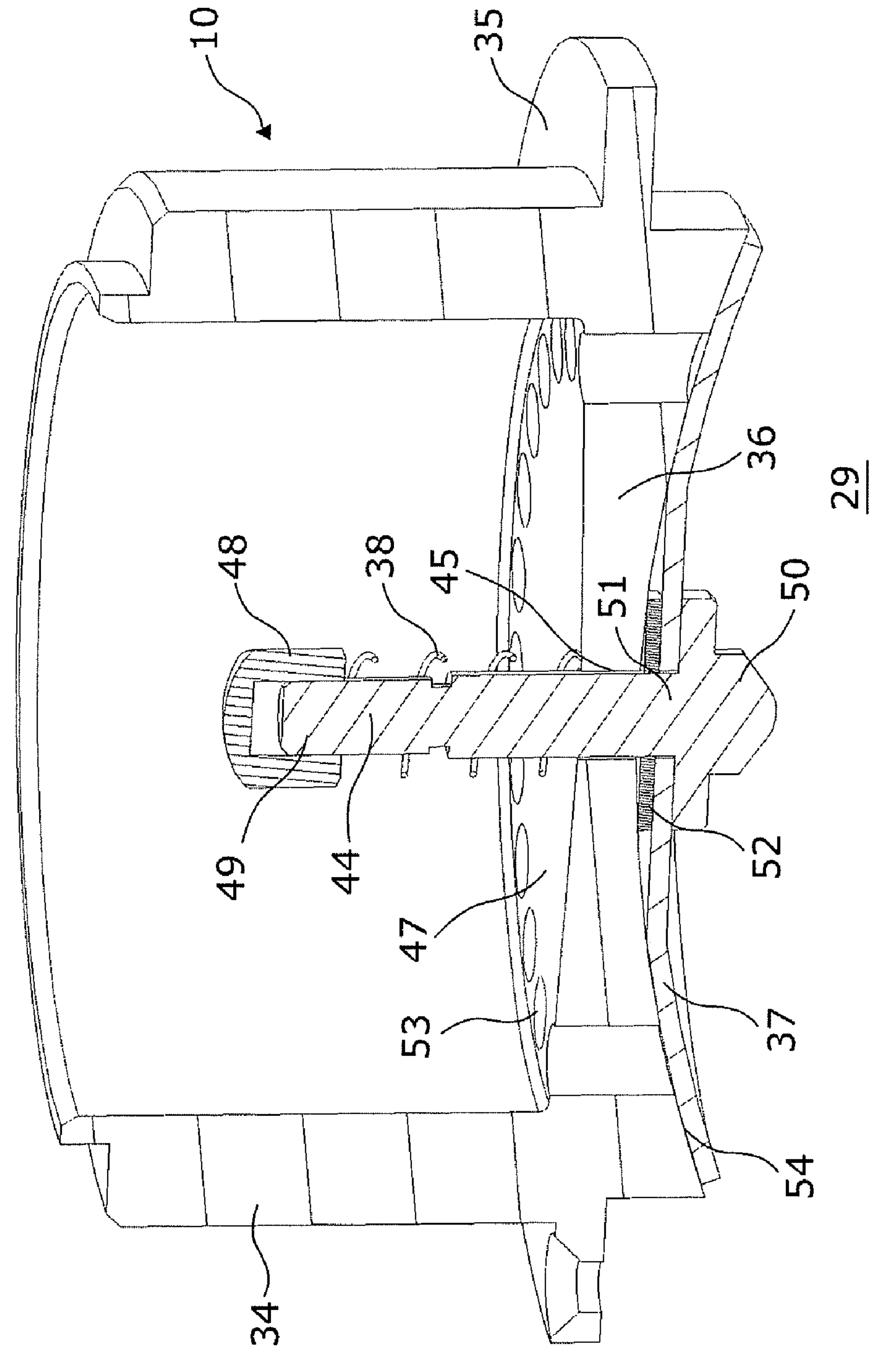
FIG. 10 is an axial section through the valve of FIG. 9, shown in closed state.
Figure 11:
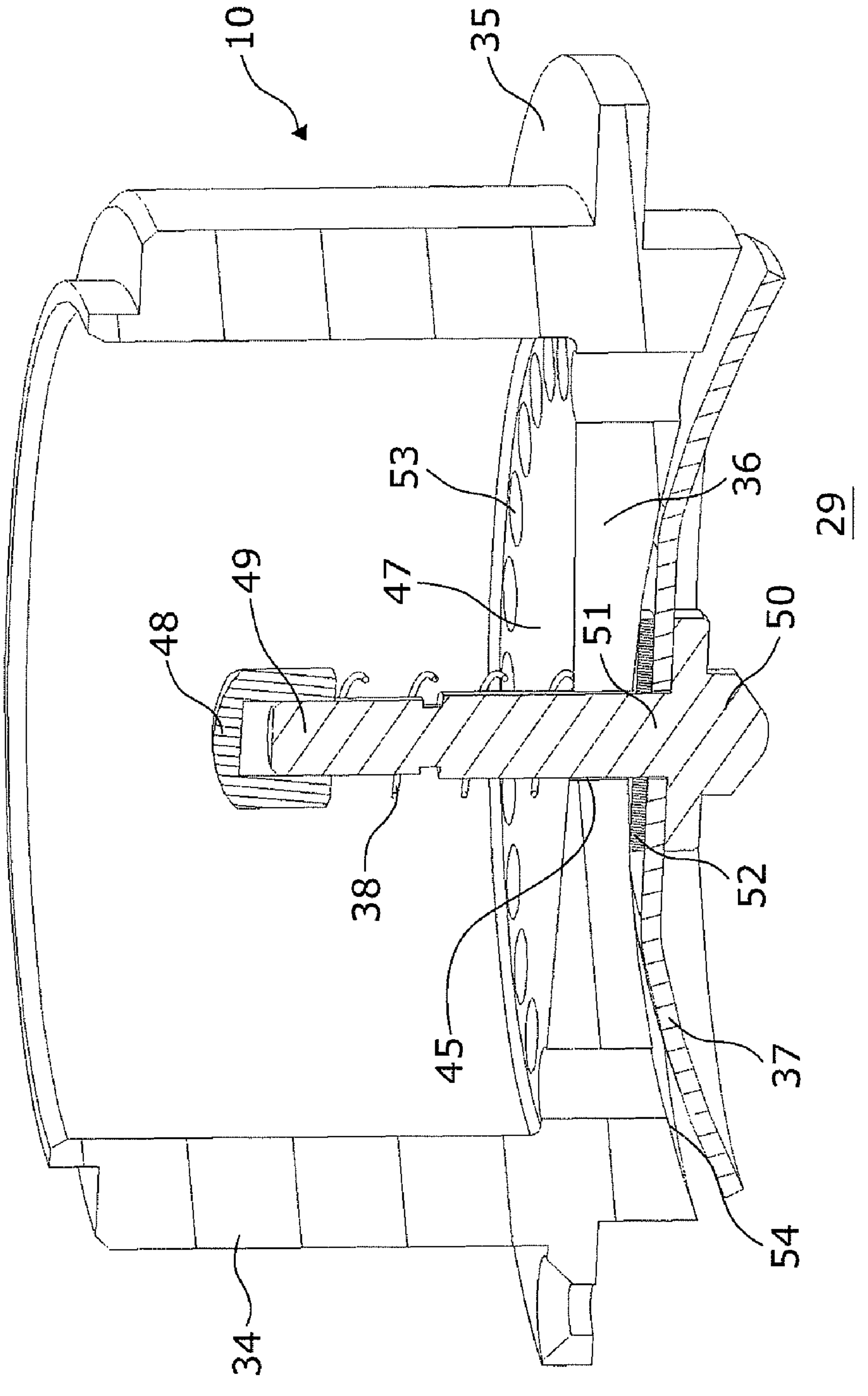
FIG. 11 is an axial section through the valve of FIG. 9, shown in open state.

The non-return valve 10 is shown in detail in the FIGS. 9 to 11. The non-return valve 10 comprises a substantially cylindrical housing 34 with an outer mounting collar 35 at a lower end, an inner, circular, disc-formed valve seat 36 formed integrally with the housing 34 and facing the inside of the compression chamber 29, and a thin, flexible, circular, disc-formed valve element 37 biased against the valve seat 36 by means of a compression spring 38 arranged around a shaft 44 that is mounted axially displaceable in a central hole 45 in the valve seat 36. The valve seat 36 has a backside 47 and a front side 54. The compression spring 38 located around the shaft 44 is compressed between the backside 47 of the valve seat 36 and a first end stop 48 fixed on a top end 49 of the shaft 44. A second end stop 50 is fixed on a bottom end 51 of the shaft 44 and abuts the disc-formed valve element 37. An intermediate washer 52 may be located between a central part of the disc-formed valve element 37 and the valve seat 36. Along its periphery, the valve seat 36 is provided with a plurality of through holes 53, through which air may enter from the backside 47 of the valve seat 36 to the front side 54 of the valve seat 36, when the disc-formed valve element 37 is flexed away from the valve seat 36, as shown in FIG. 11. It is preferred that the front side 54 of the valve seat 36 is concave, as shown in FIGS. 10 and 11, in order to provide better abutment between the disc-formed valve element 37 and the valve seat 36; this is, however, not necessary. In the open position of the non-return valve, as shown in FIG. 11, the compression spring 38 is not even compressed more than in the closed position shown in FIG. 10; however, the compression spring 38 may be compressed further than shown in order to open the non-return valve 10 even more.

The flexible, disc-formed valve element 37 may have the form of a valve flap made of a filter material that is impervious to dust in a suitable degree.

According to the present invention, another type of pressure controlled valve 10 may also be applied, whereby the valve is adapted to open, when the pressure inside the compression chamber 29 is smaller than the pressure at the surroundings of the tablet press, and adapted to close, when the pressure inside the compression chamber is larger than the pressure at the surroundings of the tablet press. Such a pressure controlled valve may be controlled by a computer on the basis of a signal provided by a pressure transducer registering the pressure in the compression chamber 29 and on the basis of a pressure transducer registering the pressure at the surroundings. The pressure controlled valve may be actuated electrically. The pressure controlled valve may also be controlled fully mechanically and/or pneumatically.

In order to clean the interior of the compression unit 14 between batches of different products or in order to exchange the unit for another type of unit, the rotary tablet press 1 shown in FIG. 1 is equipped with a handling system for removal of the unit from the press and for placement of another unit in the press.

Figure 2:
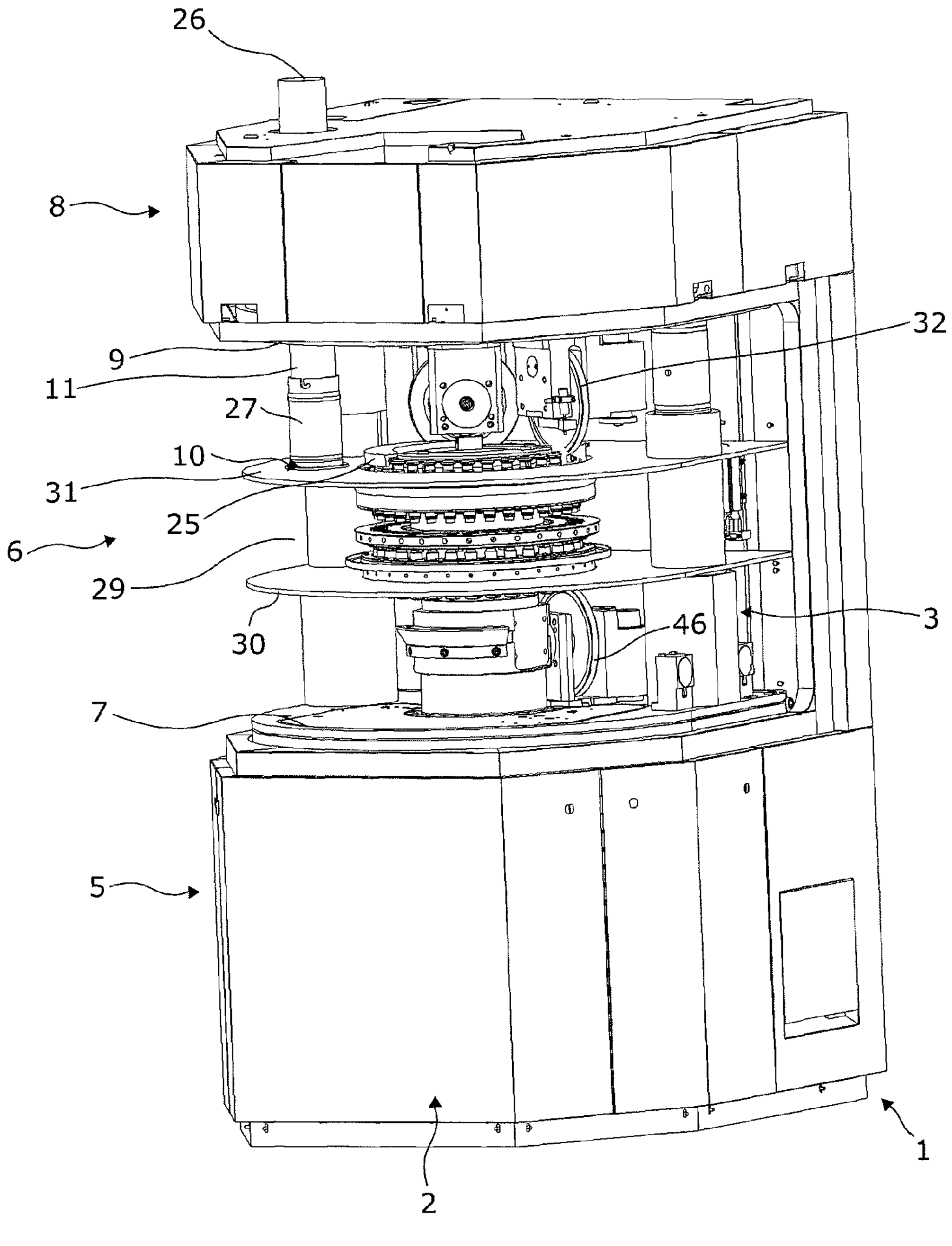
FIG. 2 is view similar to that of FIG. 1 of another embodiment of the rotary tablet press according to the invention.

FIG. 2 shows another embodiment of the rotary tablet press according to the invention, whereby the housing does not comprise a detachable compression unit in the compression section 6. Instead, the compression chamber 29 is comprised between a bottom wall 30 and a top wall 31 arranged in a well-known manner fixed in the housing and situated in the compression section 6 between the lower partition wall 7 and the upper partition wall 9. The non-return valve and/or pressure controlled valve 10 is arranged in the top wall 31, as shown in FIG. 2, in the same way as it is arranged in the top wall 39 of the casing 13 of the compression unit 14 in the embodiment shown in FIG. 1. Furthermore, the rotary tablet press shown in FIG. 2 is, in the same way as the rotary tablet press shown in FIG. 1, provided with a feeding device, a tablet chute and dust extraction nozzles 69, 70 connected with a dust extraction coupling half 67. These devices are, however, for the sake of simplicity, not shown.

The invention has in the above been explained by means of a tablet press having a single feeding device and a single tablet discharge device; however, the tablet press according to the invention may have several tablet discharge devices and and/or several feeding devices arranged in combination with a single die table.

What is claimed is:

1. A method of operating a rotary tablet press comprising a housing, a rotary die table having a number of dies arranged circumferentially, each die being associated with at least a first punch having a first end receivable in the die through an opening of the die and arranged for compression of a powder or granular material in the die by reciprocation of the first punch, at least a cam for cooperation with a second end of the first punch in order to effect axial displacement of the first punch by rotation of the die table, each die opening and corresponding first punch end are enclosed in a compression chamber, said compression chamber comprising at least one dust extraction nozzle communicating with a dust ex-traction tube located outside the compression chamber, and said compression chamber communicating with surroundings of the tablet press through a pressure controlled non-return valve, wherein the non-return valve is arranged to allow air to enter the compression chamber and to prevent outflow from the compression chamber to the surroundings of the rotary tablet press, the method comprising:

opening said pressure controlled non-return valve when a pressure inside the compression chamber is smaller than a pressure at the surroundings of the tablet press, and closing said pressure controlled non-return valve when the pressure inside the compression chamber is larger than the pressure at the surroundings of the tablet press.

2. The method according to claim 1, whereby the pressure controlled non-return valve is an actuated valve.

3. The method according to claim 2, whereby the actuated pressure controlled non-return valve is controlled by a computer on the basis of a signal provided by a pressure transducer.

4. The method according to claim 1, whereby the pressure controlled non-return valve is a non-actuated valve opening and closing automatically in response to the under pressure in the compression chamber.

5. A method of operating a rotary tablet press, comprising the steps of:

providing a housing, providing a rotary die table with a number of dies with die openings arranged circumferentially in said housing, providing a compression chamber, providing at least a first punch having a first end and a second end, associating each die with the first end of said first punch to receive the first end in the die opening, providing a cam to cooperate with the second end of said first punch and effecting axial displacement of the first punch by rotation of the die table, enclosing each die opening and corresponding first punch end in said compression chamber, providing at least one dust extraction nozzle in said compression chamber, providing a dust extraction tube located outside the compression chamber, connecting said at least one dust extraction nozzle with said dust extraction tube, providing a pressure controlled non-return valve, connecting one side of the pressure controlled non-return valve to the compression chamber, connecting another side of the pressure controlled non-return valve to the surroundings of the tablet press, and operating the pressure controlled non-return valve to open when a pressure inside the compression chamber is smaller than a pressure at the surroundings of the tablet press, and to close when the pressure inside the compression chamber is larger than the pressure at the surroundings of the tablet press wherein the non-return valve is arranged to allow air to enter the compression chamber and to prevent outflow from the compression chamber to the surroundings of the rotary tablet press.

6. The method of claim 5, wherein operating the pressure controlled non-return valve includes actuating the pressure controlled non-return valve.

7. The method of claim 6, wherein actuating the pressure controlled non-return valve is carried out electrically.

8. The method of claim 6, wherein actuating the pressure controlled non-return valve is carried out mechanically and/or pneumatically.

9. The method of claim 6, wherein the actuated pressure controlled non-return valve is controlled by a computer on the basis of a signal provided by a pressure transducer.

10. The method of claim 5, wherein the pressure controlled non-return valve opens and closes automatically in response to the pressure in the compression chamber.

* * * * *